United States Patent

[11] 3,536,184

| [72] | Inventor | Donald W. Myers<br>Northbrook, Illinois |
|---|---|---|
| [21] | Appl. No. | 735,947 |
| [22] | Filed | March 22, 1968<br>Division of Ser. No. 516,559, Dec. 27, 1965,<br>now Patent No. 3,397,507 |
| [45] | Patented | Oct. 27, 1970 |
| [73] | Assignee | By mesne assignments to,<br>John Morrell & Co.<br>Chicago, Illinois<br>a corporation of Delaware |

[54] VACUUM PACKAGING APPARATUS
7 Claims, 4 Drawing Figs.

[52] U.S. Cl.................................................... 198/144,
198/160
[51] Int. Cl.................................................... B65g 17/12
[50] Field of Search........................................ 214/309;
198/144, 33.(R)4, 135, 160, 165, 162; 53/243, 392/131, 20

[56] References Cited
UNITED STATES PATENTS

| 2,652,791 | 9/1953 | Liston .......................... | 198/144 |
| 3,193,082 | 7/1965 | Crane........................... | 53/392 |

*Primary Examiner*—Richard E. Aegerter
*Attorney*—Hofgren, Wegner, Allen, Stellman and McCord ABSTRACT: Vacuum packaging apparatus in which a lower layer of film is drawn downwardly into a product holder, and wherein an upper layer of film is bonded to the lower layer of film by a sealing head at a sealing station, so that the layers of film cooperate to form a package. The product holder is movable by a conveyor to a package removal station where a positive force is applied to the package to displace the same from the product holder. Package retaining means is provided adjacent the package removal station so that the package will not be prematurely displaced from the product holder.

3,536,184

VACUUM PACKAGING APPARATUS

This application is a division of Ser. No. 516,559, filed Dec. 27, 1965 now Pat. No. 3,397,507, and reference may be made thereto for a more complete description of the apparatus.

This invention relates in general to packaging apparatus, and more particularly to apparatus for packaging articles in a substantially evacuated receptacle.

In the past, it has been known to provide vacuum packaging apparatus with an intermittently driven endless conveyor having a plurality of compartment defining members thereon movable from a film drawing station wherein a first layer of film is clamped, heated and drawn into one of the compartment forming members to form a receptacle, to a loading station where the articles to be packaged are placed in the receptacle, to an initial sealing station where a second layer of film is partially sealed to the receptacle, to a further station where the air within the receptacle is withdrawn therefrom and complete sealing is effected, and to a package removal station where the packages are removed from the conveyor.

In prior art machines, the package containing members are usually moved to an inverted position where the sole means for holding the packages in the containers is the film edge clamping means. This arrangement has proven to be undesirable, in that oftentimes the packages will fall out of the conveyor before they reach the package removal station.

Accordingly, the general purpose of the present invention is to provide a packaging machine which obviates each of the disadvantages noted above in connection with prior art machines, and which is simple in construction, efficient in operation, and relatively inexpensive to manufacture and maintain.

Yet another object of the invention is to provide vacuum packaging apparatus as described above with novel means for positively holding the package within the package conveyor until the conveyor moves the package to a package removal station.

These and other objects of the invention will hereinafter become more fully apparent from the following description taken in connection with the annexed drawings, wherein.

Figure 1:
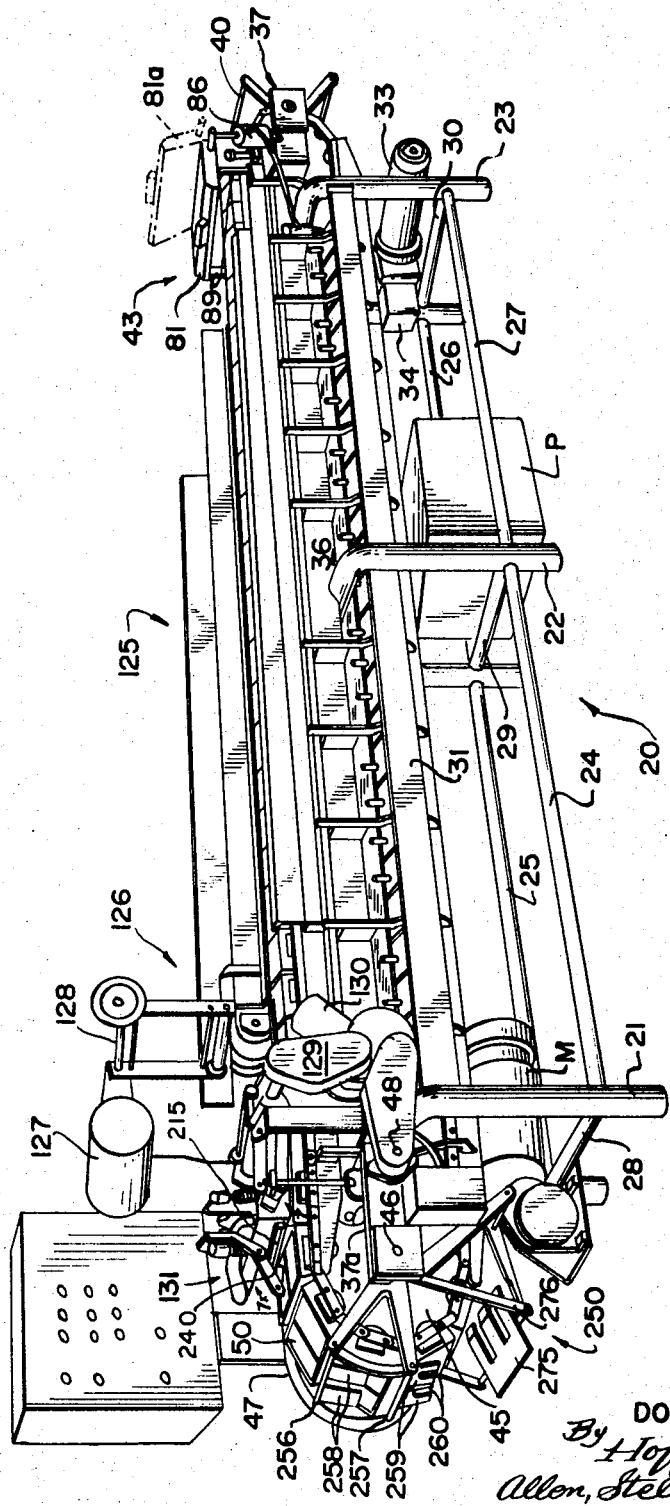
FIG. 1 is a front perspective view of a preferred embodiment of the invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The vacuum packaging machine of the present invention is shown in its entirety at 20 in FIG. 1. The machine 20 has a supporting frame, including a plurality of spaced, inverted U-shaped standards 21, 22 and 23; longitudinally-extending brace members 24, 25, 26 and 27; transversely-extending brace members 28, 29 and 30; and longitudinally-extending siderails 31 and 32. A center beam 36 is secured to standards 21—23, and extends substantially from end to end of the machine. A first generally U-shaped in plan view frame member 37 is secured to center beam 36 at the rear end of the machine, and includes spaced legs 38 and 39. A second generally U-shaped frame member 37a is secured to center beam 36 at the front of the machine, and includes spaced legs.

A first supply of suitable plastic film (not shown) is provided at the rearward end of the machine on a roll 33 secured to the frame member 23 by a bracket 34. A film guide member 40 is secured to legs 38 and 39 and film from the roll 33 is drawn over the guide member 40 to a film gripping station at the rear end of the machine.

Means are provided for conveying compartment forming members 50 to and from the film gripping station, and herein this means comprises an endless conveyor driven intermittently by spaced sprockets 45 on a shaft 46 rotatably supported at the front of the machine in legs of frame member 37a. Means, such as a Geneva drive mechanism, is provided for imparting intermittent motion to the endless conveyor, and to this end a suitable Geneva drive member (not shown) may be provided on a shaft 48 at the front of the machine for driving a suitable follower member (not shown) mounted in a housing 47 and secured to shaft 48. A motor M is mounted on the frame of the machine, and is connected to shaft 48 through a suitable drive system, not shown. The endless conveyor is defined by a plurality of interconnected links 49 (FIGS. 3 and 4) which carry rollers thereon that engage the sprockets 45.

Figure 2:
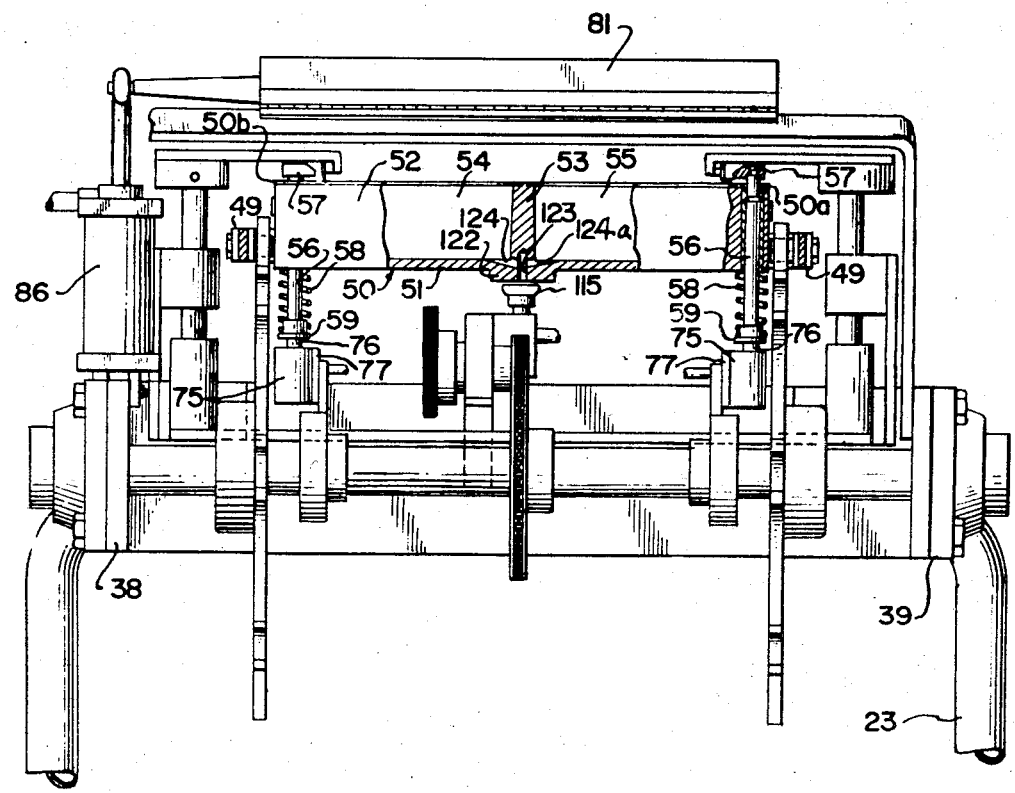
FIG. 2 is a rear elevational view of the machine of FIG. 1, with certain parts being removed for clarity of illustration, and other parts being shown in section.

Compartment forming members 50 are each carried by a pair of links 49, and the construction of members 50 is best seen in FIG. 2. As shown therein, each of the members 50 is a generally rectangular, open cuplike structure having a bottom 51, upstanding peripheral side walls 52, and a transverse central wall 53 dividing the member into two adjacent compartments 54 and 55. As will hereinafter become more fully apparent, the compartments 54 and 55 are adapted to receive the product to be packaged. It will be obvious to those skilled in the art that the member 50 may have more or less than two compartments therein, if desired.

Means are provided on member 50 for clamping the opposite edges of the film being fed off of roll 33, and this means includes a clamp 56 at each side of the member 50, with each clamp 56 having an enlarged clamping head 57 at the upper end thereof. Helical springs 58 surround the clamp members 56, and bear against enlarged flange members 59 at the lower end of members 56 to bias the members 56 downwardly and to urge the heads 57 into clamping engagement with the sides of the film. Gaskets 50a and 50b are secured to the upper portion of member 50 for a purpose to hereafter appear.

Means (not shown) are provided for positively tucking the opposite edges of the film under the clamping heads 57.

As can be best seen in FIG. 2, means are provided for positively lifting the clamping heads 57 away from the upper surface of the member 50 during the tucking operation, and this means includes a pair of hydraulic cylinders 75 that are each carried by a support member 77 secured to frame 37. Cylinders 75 each include a vertically disposed piston 76 that is adapted to engage the lower portion of the clamp members 56 upon actuation of the cylinders for moving the members 56 upwardly against the bias of springs 58. After the film has been tucked under clamping heads 57, the heads are urged into clamping engagement with the film edges by springs 58.

The film is preferably of the type which is readily stretchable after heat has been applied thereto; and, accordingly, the apparatus includes means for heating the film, and further means for drawing the heated film downwardly into the compartments 54 and 55 in the member 50. The means for heating the film includes a heating element mounted within a suitable housing 81. Housing 81 is pivotally mounted for movement between a generally horizontally-disposed operative or heating position shown in full lines in FIG. 1 and an inclined or nonoperative position shown in broken lines at 81a in FIG. 1. A pneumatic cylinder 86 is provided for moving the housing 81. The lower end of the cylinder 86 is secured by suitable means to the frame member 37. Stop members 89 (FIG. 1) are provided at opposite sides of the frame for positively locating the heater housing 81 in the operative heating position.

Thus, after the film has been fed off of the roll 33, around the guide member 40, and tucked under the clamping heads 57, the film is heated by the heating element in housing 81 sufficiently to render the same readily stretchable. The member 50 formerly in the film clamping station is then moved to the film drawing station 43 positioned immediately forwardly of the film clamping station.

Each member 50 is provided with a central boss 122 on the bottom thereof. A generally vertical bore 123 (FIG. 2) is provided in each boss 122, and passages 124 and 124a extend outwardly from each bore 123 into compartments 54 and 55 respectively. Thus, when a suction cup 115 is moved into engagement with the boss 122 by the means (not shown) a suction is applied in the compartments 54 and 55, and the previously heated film will be drawn into the compartments.

After the lower layer of film has been drawn into the compartments 54 and 55 to effectively define article receiving receptacles, the members 50 are intermittently moved from rear to front of the machine past an article loading station 125, and thence to a sealing station 126 (FIG. 1)The articles to be packaged may be manually or automatically placed in the compartments 54 and 55 on top of the film therein at the loading station 125. A second supply of film (not shown) is provided at adjacent sealing station 126 on a roll 127, and is drawn therefrom over a suitable film guide 128 by power driven rollers, also not shown, that are rotated by driven means within housing 129 operated by a motor 130. As it will be well understood by those skilled in the art, the film from roll 127 provides the upper portion of the packages for the articles in the compartments 54 and 55, and the film from roll 127 is usually provided with indicia designating the contents of the packages, etc. Suitable means, not shown, may be provided for insuring that the indicia on the film from roll 127 will be properly aligned with the articles in compartments 54 and 55.

A sealing head 131 is provided at the sealing station 126 for sealing the upper layer of film from the roll 127 to the film within compartments 54 and 55 to complete the packages.

After the packages within the compartments 54 and 55 have been evacuated and completely sealed, a knife-carrying member 215 adjacent the forward portion of the sealing head 131 is actuated to sever the sealed film between adjacent members 50.

Knife means 240 are also provided for severing the film longitudinally between adjacent packages in compartments 54 and 55 of each member 50.

After the packages within compartments 54 and 55 have been evacuated, completely sealed, and severed both longitudinally and transversely, the packages are moved to a package removal station 250 (FIG. 1) at the lower front of the machine, where they are removed from the member 50. In order to prevent premature displacement of the completed packages from a member 50 prior to movement of the member to the removal station 250, positive means are provided for holding the packages within the member 50. This mechanism will be best understood from a consideration of FIGS. 3 and 4, where the four forwardmost positions of the member 50 have been shown as a, b, c and d, respectively. The holding means includes an open generally triangularly shaped member 251 defined by diverging sides 252 and 253, and a transverse connecting portion 254. A hub 255 of member 251 mounts the same on shaft 46 for oscillatory movement relative thereto. A pair of shafts 256 and 257 extend transversely of member 251 at the outer end of sides 252 and 253, respectively. Two laterally spaced springlike plates 258 are fixed to shaft 256, with each plate 258 being positioned in alignment with one of the compartments in the members 50 for holding the packages in the compartments. In a like manner, a pair of laterally spaced springlike plates 259 are secured to shaft 257; however, the plates 259 differ from plates 258 in that they are provided with elongated openings 260 therein. Openings 260 provide access for package removal means to be hereinafter described.

Figure 3:
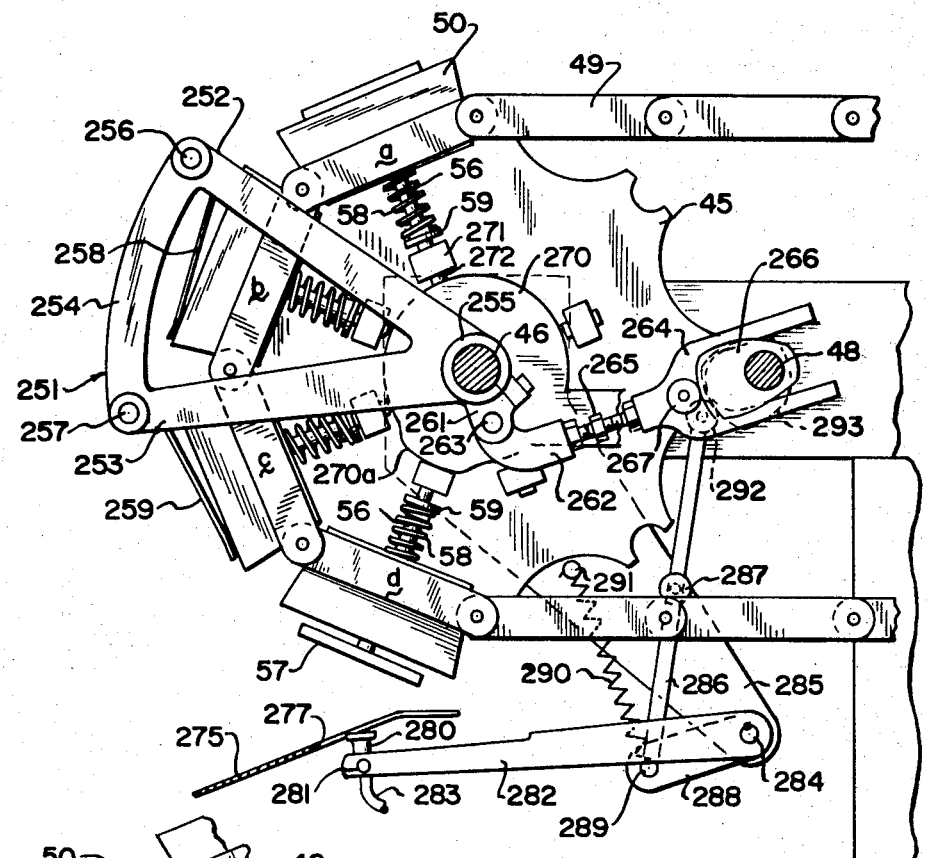
FIG. 3 is a view taken looking toward the left-hand end of FIG. 1 with parts in section.
Figure 4:
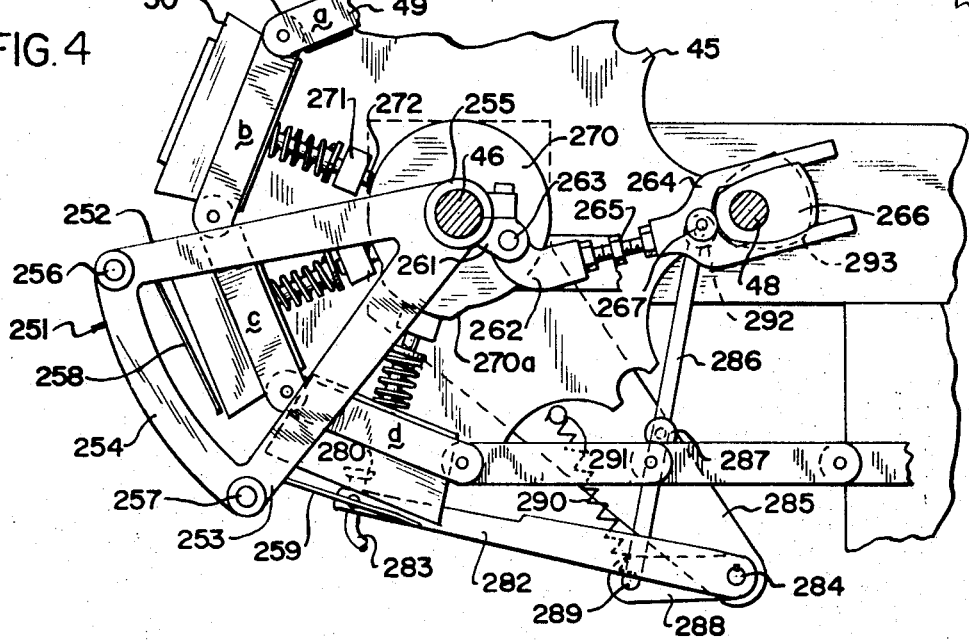
FIG. 4 is a view similar to FIG. 3, and showing certain parts in a different position.

Member 251 further includes an arm portion 261, which extends generally downwardly and rearwardly from hub 255 $c$". as viewed in FIGS. 3 and 4. A connecting rod 262 is pivotally connected to arm 261 at 263, and the other end of connecting rod 262 is connected to a cam follower carrier 264 through an adjustable link 265. A cam 266 is mounted for rotation with shaft 48, and cam 266 engages a cam follower roller 267 on rise portion of cam 266 is in engagement with the cam follower roller 267, the member 251 will be in the position shown in FIG. 3, and the plates 258 will be in the position "$b$" while the plates 259 will be in the position "$c$". Although the film clamping heads 57 are gripping the outer edges of the packages in the compartments 54 and 55, it will be appreciated that in the position "$c$" of FIG. 3 the member 50 is partially inverted, and the plates 259 serve to retain the packages within the member 50 even if the packages should come free from clamping heads 57. Means to be hereafter described are provided for releasing the film clamping heads 57 as a member 50 moves from position "$c$" to position "$d$", and the rise portion of cam 266 is coordinated with the period of the Geneva drive mechanism, so that as a member 50 moves from position "$c$" to position "$d$", the member 251 is moved into the position shown in FIG. 4. In this position, the plates 258 serve to insure that the packages at station "$c$" will be retained within the member 50, even though the film clamping heads 57 have not yet been released. While the film clamping heads 57 are released as a member 50 moves into position "$d$"; nevertheless, the plates 259 serve to retain the packages within the member 50 until positive package pullout means to be hereafter described are actuated.

The means for releasing the film clamping heads 57 includes fixed cams 270 mounted on shaft 46 adjacent sprockets 45, and held against rotation along with shaft 46 by suitable brackets connected to the frame of the machine. Cams 270 each include a rise portion 270a in radial alignment with position "$d$". A plurality of brackets 271 (eight in the illustrated embodiment) are secured to each sprocket 45, at equally circumferentially spaced positions therearound. A lift pin 272 is slidably mounted in a bore of each of the brackets 271, and is engageable with cam 270 and with enlarged portion 59 at the lower end of the clamp members 56. Thus, as the members 50 are moved into the position "$d$", the inner ends of the lift pins 272 ride over the rise portions 270a of cams 270 to force members 56 outwardly against the bias of springs 58 and release the clamping heads 57 from the edges of the packages. At this time, the packages are loosely retained within the compartments 54 and 55 of the member 50 in the "$d$" position, and are positively held therein by the plates 259.

A release plate 275 is secured to the front of the machine frame at the package removal station 250 by arms 276 (FIG. 1). Plate 275 is inclined downwardly, so as to guide packages removed from the compartments 54 and 55 to a further conveyor means, not shown. Plate 275 is provided with a pair of laterally spaced apertures 277 for passage therethrough of the package pullout means to be hereafter described.

The package pullout assembly includes a pair of suction cups 280 provided at laterally spaced positions on a transverse shaft 281. Shaft 281 is carried by a pair of generally fore and aft extending arms 282 fixed to a further shaft 284 that is pivotally secured to a mounting plate 285 carried by the frame. Suitable suction lines 283 connect the cups 280 with a source of vacuum. A generally vertically disposed shaft 286 passes through the bore of a guide sleeve 287 pivotally mounted on plate 285, and the lower end of shaft 286 is pivotally secured to the forward end of a connecting arm 288 at 289. The rear end of connecting arm 288 is fixedly secured to shaft 284. A spring 290 is connected between pivot 289 and a pin 291 on mounting plate 285 to urge the shaft 286 vertically upwardly. A cam follower roller 292 is provided at the upper end of shaft 286, and is held in engagement with a suitable cam 293 on shaft 48 by spring 290. Cam 293 is positioned on shaft 48 relative to cam 266 such that when the member 251 is in the position shown in FIG. 4, the cam follower 292 on shaft 286 is held against the low portion of cam 293 by spring 290, so that the suction cups 280 are urged upwardly through the openings 277 in plate 275 and the openings 260 in plates 259 into engagement with the packages in the compartments 54 and 55. The application of suction through the lines 283 applies a positive removal force to the packages, and they are tinues to rotate, the member 251 is moved upwardly to the position of FIG. 3, while the suction cups 280 are moved downwardly to the position of FIG. 3, and the packages thus removed from the member 50 in the "*d*" position move onto the plate 275 from which they slide to the further conveyor, not shown.

Suitable means are provided for operating the pneumatic devices 115 and 280; and such means preferably includes a motor driven pump within a housing P (FIG. 1) at the base of the frame. The pump is connected to center beam 36 for drawing a vacuum in the interior thereof, and suction cups 115 and 280 are connected to the chamber within beam 36 through air valves controlled by a suitable electric circuit, not shown.

I claim:

1. In a packaging machine having an intermittently driven conveyor, and a plurality of package containing compartments movable with said conveyor to and from a package removal station; means for removing a package from the compartment at said station comprising: means for preventing premature displacement of said package from said compartment including a package hold-in member and means for clamping said package in its compartment; means for applying a positive displacing force to said package; means for releasing said clamping means prior to the application of said displacing force; and means for moving said displacing force means into operative engagement with said package when said package is in said station.

2. In a packaging machine having an intermittently driven conveyor, and a plurality of package containing compartments movable with said conveyor to and from a package removal station where the compartment is substantially inverted; means for removing a package from the compartment at said station comprising: means for preventing premature displacement of said package from said compartment including a package hold-in member; means for applying a positive displacing force to said package; means for moving said last-named means into operative engagement with said package when said package is in said station; and said package hold-in member includes first retention means positionable under and movable with a compartment to the package removal station to prevent displacement of said package until application of said displacing force.

3. A packaging machine as defined in claim 2 in which said retention means is provided with a clearance opening to enable said force applying means to move into engagement with said package.

4. A packaging machine as defined in claim 2 in which the compartment in the station immediately preceding the package removal station is partially inverted, and wherein said package hold-in member includes second retention means positionable under the compartment immediately preceding the package removal station to prevent displacement of said package until said compartment moves into said package removal station and said displacing force is applied.

5. A packaging machine as defined in claim 4 including means pivotally supporting said hold-in member, and means for moving said hold-in member to and from a first position wherein said second retention means is positioned under the compartment in the station immediately preceding the package removal station, and a second position wherein the first retention means is positioned under the compartment in the station immediately preceding the package removal station and the second retention means is positioned under the compartment in the package removal station.

6. A packaging machine as defined in claim 5 wherein said hold-in member includes an arm extending to one side of said pivotal support, and said means for moving said hold-in member includes a shaft, means for rotating said shaft, first cam means on said shaft, and first cam follower means on said arm engaging said cam means for movement of said hold-in member upon rotation of said shaft.

7. A packaging machine as defined in claim 6 including an arm pivotally supporting said force applying means; and wherein said means for moving said force applying means into engagement with said package comprises, second cam means on said shaft, and second cam follower means associated with said arm for moving said force applying means in response to rotation of said shaft.